Sept. 25, 1962     E. C. ROWE ET AL     3,055,558
METERING, DISPENSING AND AGITATING UNIT FOR LIQUIDS
Filed Sept. 18, 1958
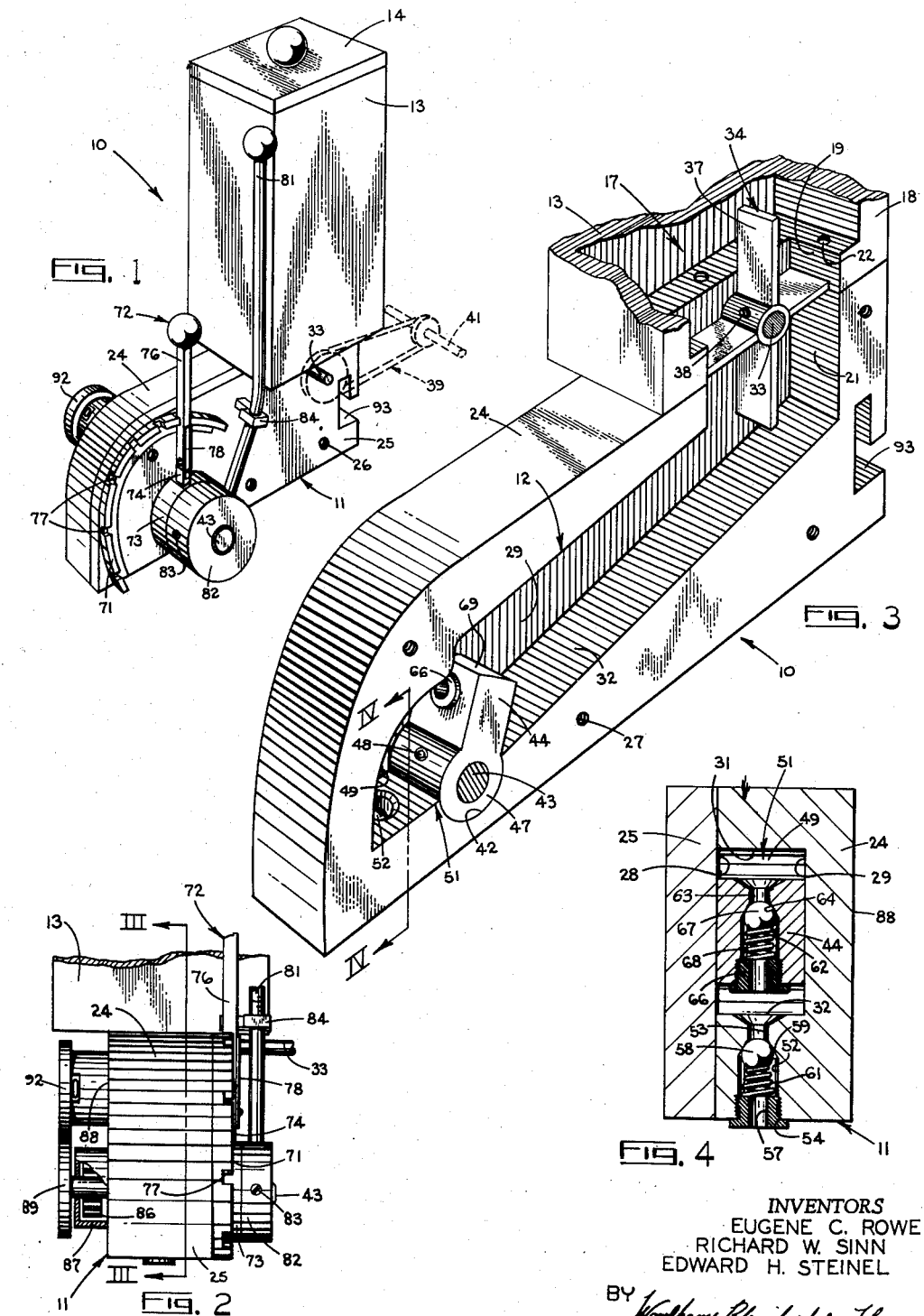
INVENTORS
EUGENE C. ROWE
RICHARD W. SINN
EDWARD H. STEINEL
BY *Woodhams Blanchard & Flynn*
ATTORNEYS

United States Patent Office 3,055,558
Patented Sept. 25, 1962

3,055,558
METERING, DISPENSING AND AGITATING
UNIT FOR LIQUIDS
Eugene C. Rowe and Richard W. Sinn, Ann Arbor, and
Edwin H. Steinel, Huntington Woods, Mich., assignors
to Color Corporation of America, a corporation of
Illinois
Filed Sept. 18, 1958, Ser. No. 761,736
5 Claims. (Cl. 222—233)

This invention relates in general to a device for dispensing liquids and, more particularly, to a type thereof capable of accurately and adjustably metering the amount of liquid dispensed and having mechanism for agitating the liquid held in said device pending its dispensing.

The utility of dispensing devices capable of accurate and predetermined control has been recognized for many years and many such devices are known. However, certain types of liquids, such as paints or pigments for example, are extremely difficult to dispense as needed from a large bulk supply because of the tendency for certain ingredients or components in the liquid to settle or precipitate within the dispensing apparatus. Moreover, it is often necessary to provide certain types of these liquids, such as pigments, in small amounts, such as a few ounces, where even minor inaccuracies in the proportions of the liquid dispensed are unacceptable. It has been found that the undesirable effects of inaccurate proportions due to settling tend to increase as the amount dispensed decreases. That is, it becomes extremely difficult to maintain the same percentages of all components or ingredients in small quantities of those liquids in which some of the ingredients will settle out unless agitated.

In view of these problems, it has been common in the past for manufacturers of paints or pigments, for example, to place these liquids in containers of assorted sizes, which are then stocked both at the factory and at points of distribution or at the retail level for use as the demand requires. This procedure has resulted in a number of problems including deterioration of the paint, large inventories of canned paint to meet the various quantitative demands, and losses due to breakage and the like.

Most manufacturers of paints used in both interior and exterior decorating provide only a few basic colors ready mixed and in cans. The majority of colors are prepared by the painter who mixes pigments according to a selected formula with a light or dark base white paint. According to existing practices, the retail dealer in paints must carry a large stock of pigments in tubes or other small containers of various sizes and pigment intensity in order to accommodate the various formulas. After a period of time certain of the ingredients of the pigment often tend to separate from each other, and it is usually impossible to stir the pigment within the small container. Thus, if less than the entire amount of pigment is used for any given job, there is no assurance that the remainder of the tube will provide a coloring which is the same as the coloring produced by the first portion of the tube. Furthermore, it is necessary for the dealer in such pigments to carry large stocks of pre-packaged pigments in order to meet the demands of the trade.

Thus, it will be seen that in every phase of stocking, distributing and using liquids like paint, there is present the problem of providing accurate predetermined amounts of the liquid in a homogeneous condition, which liquids are fresh and uncontaminated or undeteriorated due to exposure to air and/or to light.

Accordingly, the primary object of this invention has been the provision of an apparatus for dispensing liquids, such as paint and paint pigments, whereby the dispensing can be accomplished just prior to use in predetermined, accurate amounts and whereby the pigment may be continuously agitated pending dispensing thereof to avoid any precipitation or settling out of components thereof.

A further object of this invention has been the provision of a dispensing apparatus, as aforesaid, by means of which the amount of liquid dispensed can be accurately and quickly altered in predetermined amounts, and wherein the dispensing of the liquids can be accomplished by the simple operation of a manually movable handle and wherein the dispensing apparatus can be quickly and easily unloaded or reloaded as desired.

A further object of this invention has been the provision of a dispensing apparatus, as aforesaid, which is extremely easy to operate, which requires little or no maintenance and which is extremely simple in operation and construction.

Other objects and purposes of this invention will become apparent to persons familiar with this type of equipment upon reading the following specification and examining the accompanying drawings, in which:

FIGURE 1 is a perspective view including the front and one side of a dispensing device embodying the invention.

FIGURE 2 is a broken fragment of a front elevational view of said dispensing device.

FIGURE 3 is a sectional view taken along the line III—III in FIGURE 2.

FIGURE 4 is a section substantially as taken along the line IV—IV in FIGURE 3 with the dispensing vane in the lowered position.

General Construction

The objects and purposes of the invention, including those set forth above, have been met by providing a dispensing device comprising a horizontally elongated base structure supporting a supply hopper on the rear end thereof. The base structure has a lengthwise loading chamber which communicates at the rear end of said base structure with the supply chamber in the hopper. An agitation mechanism, including a paddle wheel disposed in the passageway between the supply chamber and the loading chamber is provided for effecting continuous agitation of liquids disposed in both chambers. An outlet opening extends through the bottom wall of the loading chamber near the front end thereof. A dispensing vane is pivotably supported within said loading chamber near said outlet opening for movement toward and away from said outlet opening. The walls of the chamber snugly and slidably engage the edges of said vane during a substantial portion of said pivotal movement including the nearest position of said vane to said outlet opening. Thus, as the vane is pivoted toward said outlet opening, it forces liquid trapped thereby in the front end of the loading chamber through the outlet opening.

A downwardly sensed check valve is provided in the outlet opening, which check valve is opened by movement of the vane toward said outlet opening providing liquid is disposed therebetween. An inlet opening is provided through the vane and contains a check valve sensed toward said outlet opening. Accordingly, the check valve in the vane closes when the vane moves toward the outlet opening and can open as the vane moves away from the outlet opening.

The vane is supported upon a shaft which extends through the base structure and is engaged at one end thereof on the outside of said base structure by an operating handle. An adjusting lever is pivotably supported upon the vane shaft and is adjustably and releasably engageable with a quadrant supported upon the side of said base structure. The rotational movement or stroke of the handle is controlled by the position of the lever on the quadrant. The opposite end of the vane shaft is connected to resilient means which continuously urges the handle, hence the vane, away from the outlet opening.

A counter is supported upon the base structure near the resilient means for operation in response to pivotable movement of the vane shaft.

Detailed Description

For convenience in description, the terms "upper," "lower" and derivatives thereof will have reference to the dispensing apparatus of the invention in its normal position of operation, as appearing in FIGURES 1, 2 and 3. The terms "front," "rear" and derivatives thereof will have reference to the left and right ends respectively of the dispensing apparatus as appearing in FIGURES 1 and 3. The terms "inner," "outer" and derivatives thereof will have reference to the geometrical center of said dispensing apparatus and parts thereof.

The dispensing apparatus 10 (FIGURES 1 and 2), herein selected to illustrate a preferred embodiment of the invention, is comprised of a horizontally elongated base structure 11 having a supply hopper 13 supported upon the rear end of the base structure 11. The base structure 11 contains a lengthwise loading or supply chamber 12 (FIGURE 3) and hopper 13 has a supply chamber 17 which is closed at its upper end by the cover 14. The bottom wall 18 of the supply hopper 13 has an opening 19 which communicates with an upwardly extending passageway 21 connected to the rearward end of the loading chamber 12. The hopper 13 is removably secured upon the base structure 11 by any convenient means such as the screws 22 which extend through the bottom wall 18 and are threadedly received into the base structure 11.

The base structure 11 (FIGURE 1) has a removable side plate 25 which is secured to the body 24 of the base structure by means including the screws 26 which are threadedly received into the screw openings 27 (FIGURE 3) in said body 24. The side plate 25 provides one side wall 28 of the loading chamber 12, which has another side wall 29, a top wall 31 and bottom wall 32. These walls are preferably arranged so that the cross-sectional contour of said loading chamber 12 is rectangular.

An agitation shaft 33 (FIGURE 3) extends through the upper end of the passageway 21 and the side plate 25 (FIGURE 1) in the direction substantially perpendicular to said side plate 25. An impeller 34 having radial blades 37 is supported upon said agitation shaft 33 and secured thereto by means, such as a set screw 38. The shaft 33 may, for example, be connected by a drive mechanism indicated in broken lines at 39 in FIGURE 1, to a line shaft 41 for rotation of the impeller 34.

The loading chamber 12 preferably, but not necessarily, slopes somewhat downwardly toward the front of the base structure 11. A substantially semi-cylindrical recess 42, the axis of which is substantially perpendicular to the side walls 28 and 29, is provided in the upper surface of the bottom wall 32 near its front end. A vane shaft 43, which is coaxial with said cylindrical recess 42, extends through the side walls 28 and 29 and beyond both outer sides of the base structure 11. A vane 44 is secured to and extends radially from a sleeve 47 which is supported upon the vane shaft 43 and is snugly and rotatably disposed within the recess 42. The sleeve 47 may be secured to the vane shaft 43 by means such as the set screw 48. The loading chamber 12 has a front end wall 49 which curves upwardly and rearwardly from the bottom wall 32 to a position approximately directly above the vane shaft 43, where it is joined with the top wall 31. The front end wall 49 defines a portion of a cylindrical surface which is coaxial with the vane shaft 43 and has a radius substantially equal to the radial extent of the vane 44. The front end wall 49, the portions of side walls 28 and 29 adjacent thereto and the portion of bottom wall 32 forwardly from the rear edge of recess 42 define a metering compartment 51.

When the vane 44 (FIGURE 3) is in a substantially vertical position or any position forwardly thereof, it is in continuous, snug and slidable engagement with the arcuate wall 49, the side walls 28 and 29 and the wall defined by the recess 42 in the bottom wall 32. Accordingly, the vane 43 serves as a movable rear end wall for the metering compartment 51 at the front end of the loading chamber 12.

The bottom wall 32 has an outlet opening 52 (FIGURE 4), which communicates with the metering compartment 51 and has a constriction 53 near its upper end. Said opening 52 is internally threaded near its lower end for reception of an externally threaded plug 54 having a coaxial opening 57. A ball type valve 58 is disposed within the outlet opening 52 between the constriction 53, the lower side of which forms a valve seat 59, and the plug 54. Resilient means, such as a spiral spring 61, is disposed between the valve 58 and the plug 54 to continuously and resiliently urge said ball valve 58 against the valve seat 59. It will be apparent that the valve mechanism comprising the ball 58, the valve seat 59 and spring 61 is sensed for downward flow of liquid through the opening 52.

The vane 44 contains an inlet opening 62 (FIGURE 4) therethrough having a constriction 63 near its upper end providing a downwardly facing valve seat 64. Said opening 62 is internally threaded near its lower end for threaded reception of a plug 66 which is spaced from the valve seat 64. A ball type valve 67 is urged against said valve seat 64 by one end of a valve spring 68 which bears at its other end against the plug 66. The valve 67 is sensed to permit the flow of fluid from the loading chamber 12 through the inlet opening 62 and into the metering compartment 51 when the vane 44 is in engagement with the arcuate wall 49.

When the vane 44 is moved counterclockwise, substantially as appearing in FIGURE 3, and there is liquid within the metering compartment 51, such liquid will be forced by the vane 44 to open the valve 58 and flow through the outlet opening 52. The liquid trapped in the metering compartment will be unable to flow through the opening 62 in the vane into the loading chamber 12 during such movement of the vane because the valve 67 is sensed in the opposite direction. However, when the vane 44 is moved in a clockwise direction, as appearing in FIGURE 3, the valve 67 will be opened and the valve 58 will be closed. Thus, liquid can flow from the loading chamber 12 into the metering compartment 51 in response to the low pressure developed in the metering compartment during such clockwise movement of the vane 44. The weight or head of the liquid within the loading chamber 12 and supply chamber 17 will also tend to open the valve 67 during the retraction or clockwise movement of the vane 44. When the vane 44 is in its completely retracted or rearward position, as shown in FIGURE 3, the radially outer edge 69 thereof may be spaced from and rearwardly of the arcuate wall 49 so that liquid can freely flow over said outer edge into the metering compartment 51.

An arcuate control quadrant 71 (FIGURES 1 and 2) is mounted upon the outer surface of the side plate 25 near the front end thereof so that it is concentric with the vane shaft 43. A control lever 72 has a radially inner portion 74 rigidly secured to the hub 73 which is rotatably supported upon the vane shaft 43 adjacent to the outer surface of the side plate 25. Said lever 72 also has a radially outer portion 76 which is pivotally supported upon the inner portion 74 for movement about an axis spaced inwardly from said quadrant and disposed transversely of the rotational axis of the vane shaft 43. The quadrant 71 has a plurality of spaced notches 77 into which the outer portion 76 of the lever 72 is slidably receivable, said outer portion being removed from any one of said notches 77 by pivoting it with respect to the inner portion 74. A leaf spring 78 is secured to the inner portion 74 and engages the outer surface of the outer portion 76 for continuously urging the outer portion 76 into engagement with the control quadrant 71.

A vane operating handle 81 is secured by means of the hub 82 and a set screw 48 to the vane shaft 43 adjacent to the hub 73. A stop member 84 is secured to the handle 81 and arranged for engagement with the upper portion of the lever 72, whereby pivotable movement of the handle 81 in a counterclockwise direction, as appearing in FIGURE 1, can be selectively and positively limited. The notches 77 in the quadrant 71 are arranged so that engagement between the stop member 84 and the lever 72 will occur when preselected increments of liquid within the metering compartment 51 are forced by the vane 44 to pass through the outlet opening 52.

The end of the vane shaft 43, which extends beyond the side 88 (FIGURE 2) of the body 24, is encircled by coil spring 86 which is secured to said shaft at its inner end. The outer end of the coil spring 86 is secured to a spring enclosing housing 87 which is supported upon the outer side 88 by any convenient means. The vane shaft 43 extends through and beyond the housing 87 where it supports a driving element 89 for operating a counter 92 which is also mounted upon the outer side 88 and which is arranged for indicating the number of strokes or pivotable movements of the vane shaft 43 hence the vane 44 in a counterclockwise direction as appearing in FIGURE 3. The coil spring 86 is arranged to resiliently resist rotation of the vane shaft 43 in said counterclockwise direction and urge the vane 44 into a position substantially as shown in FIGURE 3. It will be recognized that means other than the coiled spring 86 may be used for effecting a return or clockwise movement of the vane 44. For example a hydraulically actuated mechanism (not shown) may be connected to the vane shaft 43 for moving the shaft and vane from their FIGURE 4 positions to their FIGURE 3 positions.

Additional sealing devices, not shown, may be provided upon the vane 44 for the purpose of effecting a more leak-proof engagement between said vane and the walls of the metering compartment 51 as said vane moves therethrough.

An undercut slot 93 (FIGURE 3) is provided in the rearward end of the base structure 11 for the purpose of mounting the dispensing apparatus 10 upon a supporting structure, not shown.

*Operation*

Having mounted the dispensing apparatus in a position for use, it is prepared for operation by connecting the agitating shaft 33 to a line shaft 41 by means of the drive mechanism 39 and then filling the supply hopper 13 with the liquid to be dispensed. Unless manually held otherwise, the handle 81 will be in its FIGURE 1 position under the urging of the coil spring 86 whereby the vane 44 will be in its FIGURE 3 position. Accordingly, the liquid within the supply hopper 13 will immediately flow into and fill both the loading chamber 12 and the metering compartment 51. Because of the downward slope in the loading chamber 12, the metering compartment 51 will remain filled with the liquid to be dispensed as long as there is enough liquid in the loading chamber to engage any part of the top wall 31 thereof.

The counter 92 is zeroed by appropriate adjustment thereof. The line shaft 41 is energized so that the agitation shaft 33, hence the impeller 34, rotates at a slow continuous speed whereby the liquid within the supply chamber 17, the loading chamber 12 and even the metering compartment 51, when the vane 44 is in its FIGURE 3 position, is kept in continual motion and agitation. Such agitation prevents the heavier ingredients of certain liquids from settling out as they otherwise would.

The lever 72 is adjusted with respect to the control quadrant 71 so that it will stop the handle 81 after a selected amount of liquid has been discharged from the outlet opening 57. Adjustment of the control lever 72 is effected by pivoting the outer portion 76 thereof away from the quadrant 71 and then rotating the lever while in such pivoted position around the vane shaft 43 until it reaches the desired position whereupon it is permitted to move under the urging of the spring 78 toward the control quadrant 71 for engagement with one of the notches 77 therein.

Liquid within the metering compartment 51 can now be dispensed simply by moving the handle 81 in a counterclockwise direction, as appearing in FIGURE 1, until the stop member 84 on the handle engages the outer portion 76 of the lever 72. Such movement of the handle 81 is opposed by the coil spring 86 which, when the handle is released, causes the handle to return to its FIGURE 1 position. As the vane 44 is moved by the handle 81 toward its FIGURE 4 position within the metering compartment 51, the liquid trapped within the metering compartment 51 will be urged past the valve 58 and through the outlet opening 52. Inasmuch as the check valve 67 is sensed in the opposite direction, it will remain closed during the dispensing or discharging movement of the vane 44. However, during the return movement of said vane 44, the valve 67 will be opened, thereby permitting liquid to flow from the loading chamber 12 into the meter compartment 51.

The valve spring 61 in the outlet opening 57 is selected so that the weight of the liquid within the metering compartment 51 will not open the valve 58, and positive pressure must be applied by the vane 44 to effect a discharge of the liquid.

By means of the counter 92 and the control lever 72, accurate and various amounts of liquid can be dispensed from the apparatus 10 simply by moving the handle 81 around the axis of the vane shaft 43.

Although a particular preferred embodiment of the invention has been disclosed in detail above for illustrative purposes, it will be understood that variations or modifications of such disclosure, which lie within the scope of the appended claims, are fully contemplated.

We claim:

1. A liquid dispensing apparatus comprising: means defining a metering compartment having a base wall, a pair of spaced side walls perpendicular to said base wall and an arcuate end wall curving into said base wall; a supply chamber communicating with said metering compartment and means within said supply chamber for agitating said liquid, a vane pivotally supported near one edge thereof upon said base wall for movement about an axis extending transverse to said side walls and lying substantially within a plane defined by said base wall, the opposite sides of said vane being snugly and slidably engageable with said side walls and the radial edge of said vane being snugly and slidably engageable with said arcuate end wall; an outlet opening through said base wall and a check valve within said outlet opening sensed to permit liquid under pressure to flow from said metering compartment through said outlet opening; an inlet opening through said vane and a check valve in said inlet opening sensed to permit flow of liquid from said supply chamber through said inlet opening into said metering compartment; operator means for moving said vane around said axis and along said arcuate wall; and adjustable stop means for limiting movement of said operator means and thereby limiting movement of said vane toward said base wall whereby a predeterminable amount of liquid within said compartment is urged through said outlet opening.

2. A dispensing device for liquids comprising: means defining an elongated downwardly sloping loading chamber having a bottom wall and a pair of spaced side walls substantially perpendicular to said bottom wall; a vane pivotally supported within said chamber near the lower end thereof for movement around an axis extending transverse to said side walls and lying substantially within a plane defined by said bottom wall, said chamber having near said lower end thereof an arcuate end wall co-axial with said axis and equal in radius to the radial length of said vane for snug sliding engagement with the radial edge thereof, the sides of said vane also snugly and slidably engaging said side walls, said arcuate wall combining with said side walls, base wall and said vane to define a metering compartment at said lower end of said loading chamber; an outlet passageway through said bottom wall communicating with said metering compartment, and a check valve in said outlet passageway sensed to permit flow of liquid under pressure from said metering compartment through said outlet passageway; an inlet passageway through said vane and a check valve within said inlet passageway sensed to permit flow of liquid into said metering compartment; operator means for moving said vane around said axis a selected distance in one direction; and adjustable stop means for limiting movement of said operator means and thereby limiting movement of said vane toward said bottom wall whereby a predetermined amount of liquid within said compartment is forced through said outlet passageway, said compartment being filled with liquid passing through said inlet passageway when said vane is moved in the other direction.

3. The structure of claim 2 wherein said loading chamber communicates at its upper end with a supply hopper, and wherein agitating means is disposed within said loading chamber at the junction thereof with said supply hopper.

4. The structure of claim 2, wherein said operator means for moving said vane includes a shaft supporting said vane, a handle secured to said shaft, said adjustable stop means being associated with said handle for limiting the rotational movement of said shaft around said axis.

5. The structure of claim 4 including a coil spring connected at its inner end to said shaft and secured at its outer end to said means defining said loading chamber, said spring tending to urge said vane away from said outlet opening, whereby said metering compartment is placed in direct communication with the remainder of said loading chamber; and wherein said adjustable stop means includes a lever pivotably supported upon said shaft adjacent to said handle and a notched quadrant with which said lever is removably engageable, said quadrant being mounted upon said chamber defining means.

References Cited in the file of this patent
UNITED STATES PATENTS

| | | |
|---|---|---|
| 35,465 | Munson | June 3, 1862 |
| 886,882 | Smith | May 5, 1908 |
| 1,050,339 | Cassidy | Jan. 14, 1913 |
| 1,617,922 | Morrison | Feb. 15, 1927 |
| 1,859,290 | Davis | May 24, 1932 |
| 1,886,022 | Hutton | Nov. 1, 1932 |
| 2,605,021 | Churchill et al. | July 29, 1952 |
| 2,793,940 | Bennett | May 28, 1957 |